US011358065B2

(12) United States Patent
Goldfarb et al.

(10) Patent No.: US 11,358,065 B2
(45) Date of Patent: Jun. 14, 2022

(54) FACILITATING RHYTHM-BASED USER INPUT WITH ENHANCED FEEDBACK AND AUDIO TRACKS

(71) Applicant: Funcom Oslo AS, Oslo (NO)

(72) Inventors: David Goldfarb, Stockholm (SE); Anders Pettersson, Stockholm (SE); Maria Ström, Stockholm (SE); Elvira Björkman, Stockholm (SE); Nicklas Hjertberg, Stockholm (SE); Emelie Persson, Stockholm (SE)

(73) Assignee: Funcom Oslo AS, Oslo (NO)

(*) Notice: Subject to any disclaimer, the term of this patent is extended or adjusted under 35 U.S.C. 154(b) by 63 days.

(21) Appl. No.: 17/072,762

(22) Filed: Oct. 16, 2020

(65) Prior Publication Data

US 2021/0339147 A1 Nov. 4, 2021

Related U.S. Application Data

(60) Provisional application No. 63/018,230, filed on Apr. 30, 2020.

(51) Int. Cl.
*A63F 13/25* (2014.01)
*A63F 13/814* (2014.01)
*A63F 13/20* (2014.01)
*A63F 13/46* (2014.01)

(52) U.S. Cl.
CPC ............ *A63F 13/814* (2014.09); *A63F 13/20* (2014.09); *A63F 13/46* (2014.09)

(58) Field of Classification Search
CPC .......... A63F 13/25; A63F 13/40; A63F 13/44; A63F 13/45; A63F 13/46; A63F 13/50; A63F 13/53; A63F 13/537; A63F 13/54; A63F 13/55; A63F 13/56; A63F 13/58; A63F 2300/30; A63F 2300/306; A63F 2300/6063; A63F 2300/6072; A63F 2300/61; A63F 2300/8047; A63F 2300/8076
See application file for complete search history.

(56) References Cited

U.S. PATENT DOCUMENTS

| | | | |
|---|---|---|---|
| 6,177,623 B1 | 1/2001 | Ooseki | |
| 8,076,565 B1 | 12/2011 | Bennett | |
| 8,907,193 B2 | 12/2014 | Cross et al. | |
| 2007/0000374 A1 | 1/2007 | Clark et al. | |

(Continued)

FOREIGN PATENT DOCUMENTS

JP 2001246156 A 9/2001

OTHER PUBLICATIONS

Tapulous, Inc., "Tap Tap Radiation for iPad on the iTunes App Store," retrieved from http://itunes.apple.com/US/app.tap-tap-radilaion/id364160328, Mar. 3, 2011.

(Continued)

*Primary Examiner* — Omkar A Deodhar
(74) *Attorney, Agent, or Firm* — Banner & Witcoff, Ltd.

(57) ABSTRACT

Aspects of the disclosure relate generally to computer software and musical gameplay elements. More specifically, aspects of the disclosure provide a method of using multiple musical tracks of varying intensity based on well-timed user inputs and/or player advancement in a rhythm-based video game. Other aspects of the disclosure relate to techniques to improve player on beat inputs in a rhythm-based video game.

20 Claims, 11 Drawing Sheets

(56) References Cited

U.S. PATENT DOCUMENTS

2007/0155494 A1 7/2007 Wells et al.
2008/0271591 A1 11/2008 Lemons
2010/0092933 A1 4/2010 Kuchera et al.
2017/0056772 A1 3/2017 Eng et al.

OTHER PUBLICATIONS

Harmonix Music Systems, Inc., "Rock Band, The Game that Started ii All," retrieved from http://www.rockband.com/games/rb, Mar. 3, 2011.
Activision Publishing, Inc., "Guitar Hero," retrieved from http://hub.guitarhero.com/games/gh, Mar. 3, 2011.
Guitar Freaks Tech Info, retrieved from http://www.gamespol.com/ps/action/guitarfreaks/lech_info.html, Mar. 3, 2011.
Beatmania (Bundle)Tech Info, retrieved from http://www.gamespol.com/ps2/beatmania/lech_info.html, Mar. 3, 2011.
Com2uS Corp., "World of Tunes for iPhone, iPod touch, and iPad on the iTunes App Store," retrieved from http://tunes.apple.com/US/app.worid-of-tunes/id313833285, Mar. 3, 2011.
International Search Report and Written Opinion of the International Searching Authority dated Jan. 7, 2011 in International Application No. PCT.US10/50735.
IGN. "BPM: Bullets Per Minute (Rhythm FPS)—Official Announcement Trailer". YouTube. Apr. 30, 2020. Retrieved from https://www.youtube.com/watch?v=rH2KIJVT5Wg.
Dangerskew. "Chroma—Cancelled Harmonix FPS Gameplay". YouTube. Jun. 9, 2016. Retrieved from https://www.youtube com/watch?v=6yMNgDIoJPE.
Jun. 30, 2021—ISR & WO—PCT/EP2021/057383.

FACILITATING RHYTHM-BASED USER INPUT WITH ENHANCED FEEDBACK AND AUDIO TRACKS

CROSS-REFERENCE TO RELATED APPLICATIONS

This application claims priority to U.S. Provisional Patent Application No. 63/018,230, entitled "Facilitating Rhythm-Based User Input with Enhanced Feedback and Audio Tracks," filed Apr. 30, 2020, which is hereby incorporated by reference in its entirety.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF USE

Aspects of the disclosure relate generally to computer software and musical gameplay elements. More specifically, aspects of the disclosure provide a method of using multiple musical tracks of varying intensity based on well-timed user inputs and/or player advancement in a rhythm-based video game. Other aspects of the disclosure relate to techniques to improve well-timed (on beat) player inputs and adjust animations to accommodate player inputs in a rhythm-based video game.

BACKGROUND

Rhythm-based video games typically comprise playback of a song and require players to provide well-timed user inputs in time with the music (e.g., on the musical beats of a song). Rhythm-based video games find implementation in many forms, such as on video game consoles, arcade cabinets, personal computers, and in augmented/virtual reality devices.

However, in these games the song typically "is" the level, with the duration of the game levels linked to the length of the songs. Additionally, the song may not adequately adapt to events in the game, or change based on a user's performance. And such games may fail to adequately account for latency issues, including reasonable human error.

Aspects herein address these and other problems.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may be implemented in a rhythm-based game. For example, the illustrative embodiment discussed herein is a first person shooter game that incorporates rhythm-based gameplay elements. But it will be appreciated that the features and techniques described herein may find application in any suitable rhythm-based game, whether first person or otherwise and incorporating any suitable rhythm-based game mechanics and/or suitable gameplay modalities besides shooters. Players can perform actions in time with the beat to improve their score, represented visually by a beat matching HUD indicator and a score multiplier. Performing actions on-beat increases the score multiplier and intensifies music using a dynamic music layering system. Unlike typical rhythm games, aspects described herein may enable player progression through a level to be tied to in-game events and player performance, rather than be beholden to the length and structure of a pre-recorded musical track.

Thus, aspects described herein may provide a method of playing progressive musical tracks as the player advances through a game level in a rhythm-based game. Segments of an overall musical piece may be used and played back to move forward in music as the player moves forward in the level. And aspects described herein may provide a method for playing increasingly intense and/or progressive musical track segments based on player performance. A game may determine a plurality of musical tracks corresponding to a level. Each musical track may comprise a different version of a song and correspond to a respective tier of a set of player performance tiers. The game may begin a level of the game, and the user may be assigned a tier of the set of player performance tiers. The game may play back audio of a first musical track, of the plurality of musical tracks, corresponding to the first tier when the player is in a first tier, of the set of player performance tiers, while playing the game. The game may track a plurality of player actions using a tier meter, wherein player actions performed on beat with the audio of the first musical track cause the tier meter to increase. The game may determine, based on the tier meter, that the player has advanced to a second tier of the set of player performance tiers. The game may play back audio of a second musical track, of the plurality of musical tracks, corresponding to the second tier when the player is in the second tier while playing the game. Playing back the audio of the second musical track comprises continuously lowering a volume of the first musical track while increasing a volume of the second musical track.

Other aspects described herein may provide for timing adjustments in computer animations in a rhythm-based video game, allowing player attacks to line up with musical features and appear on-time to a user. A speed of an animation timing may be adjusted to address a length between beats of a musical track. And player and enemy character positions may be adjusted to allow animations to better synchronize with the musical track. These aspects may be adjusted to fit a player or enemy attack animation within a time window between beats, and may provide for musically synchronized animations, generally more satisfying for players.

Aspects described herein may be implemented on any suitable platform, such as on video game consoles, arcade cabinets, personal computers, augmented reality devices, and/or virtual reality devices. These aspects may also be embodied in a computer readable medium comprising game software instructions configured to cause a computing device to perform the associated steps. They may also be embodied in a computing device comprising a processor and memory storing instructions that, when executed by the processor, cause the computing device to perform the associated steps.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the embedded drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

Aspects of the disclosure are discussed further below with reference to an example embodiment, a first-person shooter game with musical and rhythmic gameplay elements. Aspects described herein may find particular application in a first-person shooter game comprising levels that the player character moves through and in which the player encounters enemies and obstacles. Musical and rhythm-based gameplay elements may be used to control how the player interacts with enemies and obstacles in the game, and a player's on beat actions may be rewarded, such as through a higher score and/or additional damage to game enemies. According to some aspects, the game may be broken up into a series of levels. A level may correspond to the duration of a musical experience, for example a level may be one musical song. As described further herein, a level may be broken down further into logical segments, e.g., sub-levels, using an act structure corresponding to progression through the overall musical experience associated with the level.

Before discussing these concepts in greater detail, however, several examples of a computing device that may be used in implementing and/or otherwise providing various aspects of the disclosure will first be discussed with respect to FIG. 1.

Figure 1:
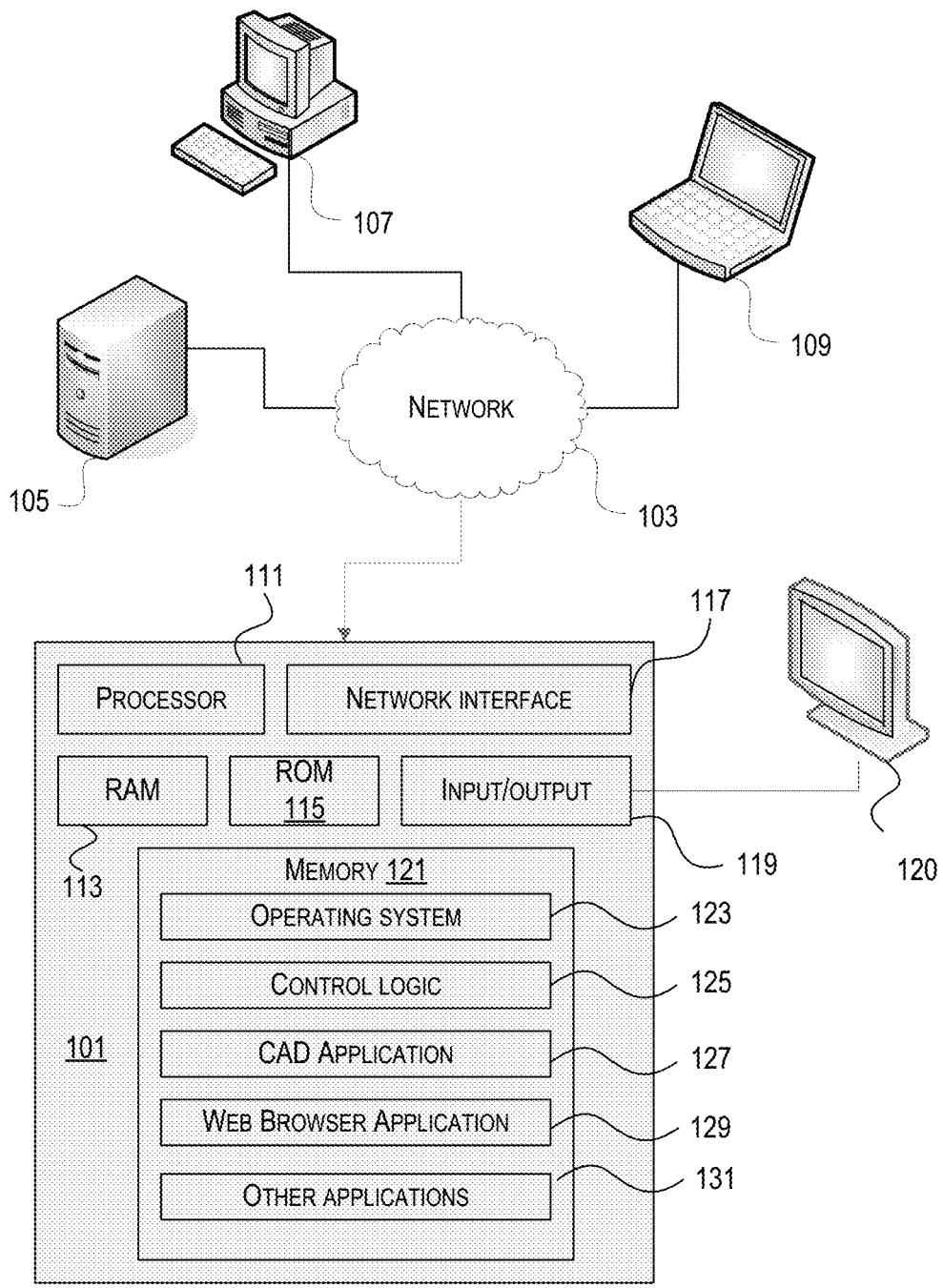
FIG. 1 depicts an example of a computing device that may be used in implementing one or more aspects of the disclosure in accordance with one or more illustrative aspects discussed herein in accordance with one or more illustrative aspects discussed herein.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, computer-aided design (CAD) application 127, web browser application 129, and other applications 129. Control logic 125 may be incorporated in and may be a part of CAD application 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Having discussed several examples of computing devices which may be used to implement some aspects as discussed further below, discussion will now turn to a method of using multiple musical tracks of varying intensity and progression based on well-timed user inputs and/or player advancement in a rhythm-based video game. Other aspects of the disclosure relate to techniques to improve player well-timed (on beat) inputs in a rhythm-based video game Layered Music Embodiments of aspects described herein may use music in several ways to enhance the experience of a game player. As a first example, embodiments may change the intensity of the game music based on a player's performance, such as due to a series of well-timed inputs. As a second example, embodiments may progress a music track as the player enters certain areas or advances through a game level. Progress and intensity of the music generated by the game may be tied to player performance and progression through a game level.

According to some embodiments, player performance may be tracked (e.g., rated) according to a set of tiers. Tiers may be used to adjust musical intensity, determine an amount of points to add to a player's score, or otherwise modify the behavior or results of the game. For example, a current tier may be used to determine how much score a player will receive for performing a certain action (killing an enemy, damaging an enemy, picking up a power-up). Music assets in the game may also be divided into tiers, according to some aspects. The tiers may correspond to increasing intensity of the music, which may be accomplished using additional layers for the music adding elements such as additional instruments, melodies, basslines, and other musical components. The different layers may be essentially different versions of the same song, with (for example) the lowest tier being the most mellow and the highest being the most intense. Typically, each tier in succession retains some or all of the musical elements of the previous tier.

In an example embodiment, player performance may be tracked in five tiers corresponding to layers of intensity. These layers of intensity may be conveyed to the user through increasingly intense music, adding additional musical layers as mentioned above. For example, a tier progression according to some aspects may be as follows:

Tier 1: Percussion and keys
Tier 2: Drums and a bassline
Tier 3: Guitar and more intense drums/bass
Tier 4: Additional guitar intensity/guitar solos
Tier 5: Vocals+all elements of other tiers As mentioned, each tier may retain some or all of the musical elements of the prior tiers, while adding musical layers to the song.

Figure 2:
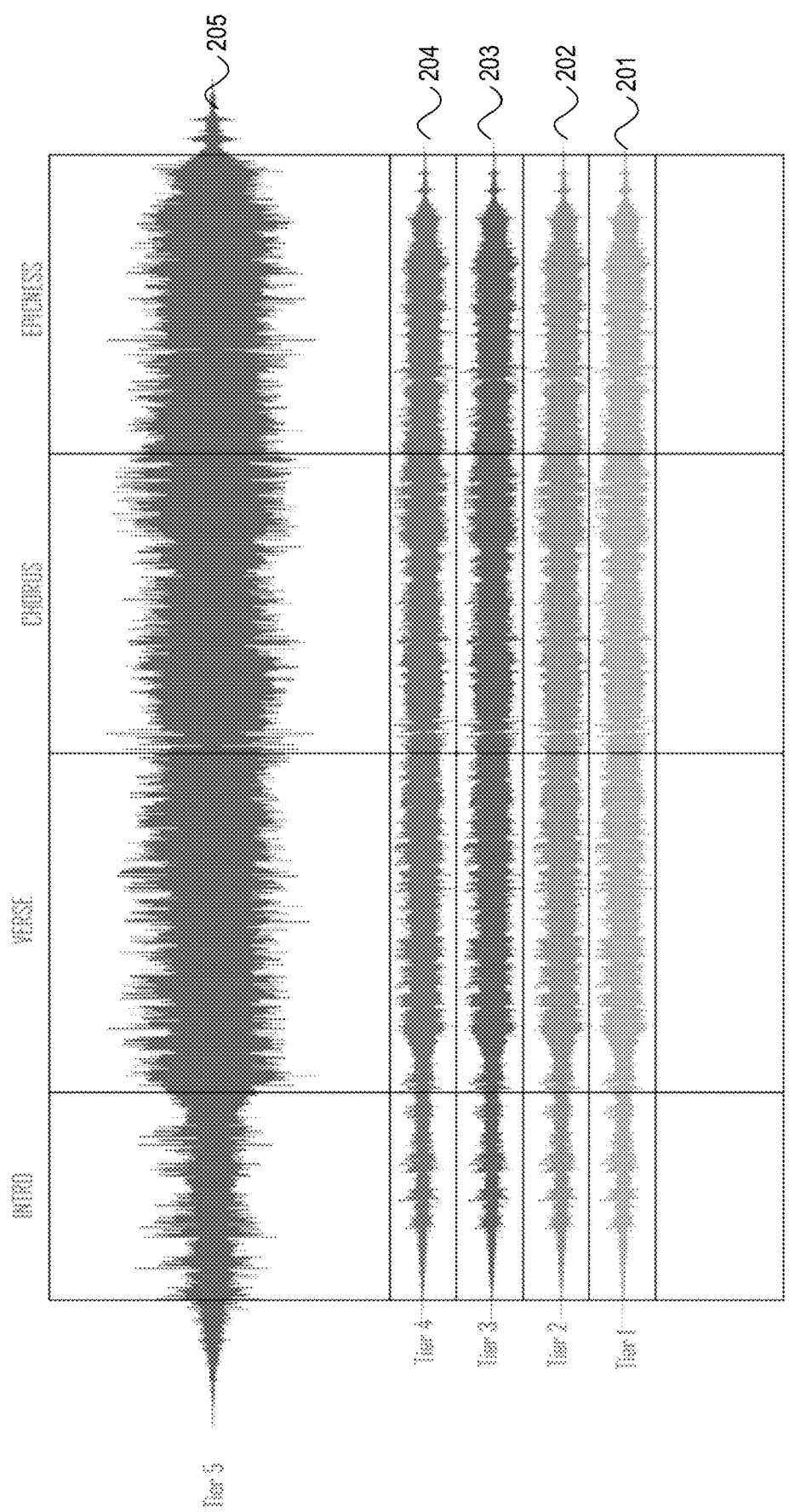
FIG. 2 depicts an illustrative arrangement of audio tracks for a given act having different tiers of intensity in accordance with one or more illustrative aspects discussed herein.

The different layers of music corresponding to the tiers may increase in intensity as the player ascends the tiers. For example, FIG. 2 illustrates an audio intensity of each music track 201-205 associated with the example 5 tiers above.

According to some aspects, each tier may be mastered independently of each other. The music of each tier may be an independent audio track, able to stand on its own rather than comprising only additional isolated instruments. By separately mastering the music tracks for each tier, rather than dynamically combining isolated instruments that can be combined programmatically, the mastering process may provide a higher quality audio output. Mastering only the additional layers and then combining them may yield unsatisfactory results from an audio quality perspective. Separately mastering the tracks may have other benefits, such as allowing composers to use the highest tier (e.g., tier 5) music track as a full song containing all instruments and vocals, which could be used as the complete soundtrack for the game.

According to some aspects, when the player achieves a new tier (discussed further herein) the game may transition to the music corresponding to the tier (whether moving up a tier to more intense music, or moving down to less intense music). An increase or decrease in musical track intensity may be controlled to happen gradually as to not overwhelm the player or make the player feel like a new piece of music has been introduced. The higher intensity track may feel like another member of the band has just come on stage while the other members are "jamming harder" (and vice versa for a tier drop). In transitioning, the game may interpolate between the music of the current tier and the music of the next tier over a period of time. This may comprise playing back music based on interpolated features of overlapping sections of the music track for the current tier of the music track for the next tier over the period of time. In some implementations, a period of around 2 seconds may provide a suitable transition window that provides a pleasing user experience. For example, a random wait period of 1 to 3 seconds may be used before fading in a track of higher or lower intensity. A random delay may provide sufficient variation to avoid causing the player to feel like transitions are static or scripted. During the transition, the volume of the music for the current tier may be gradually reduced while the volume of the music for the next tier may be increased.

Figure 3:
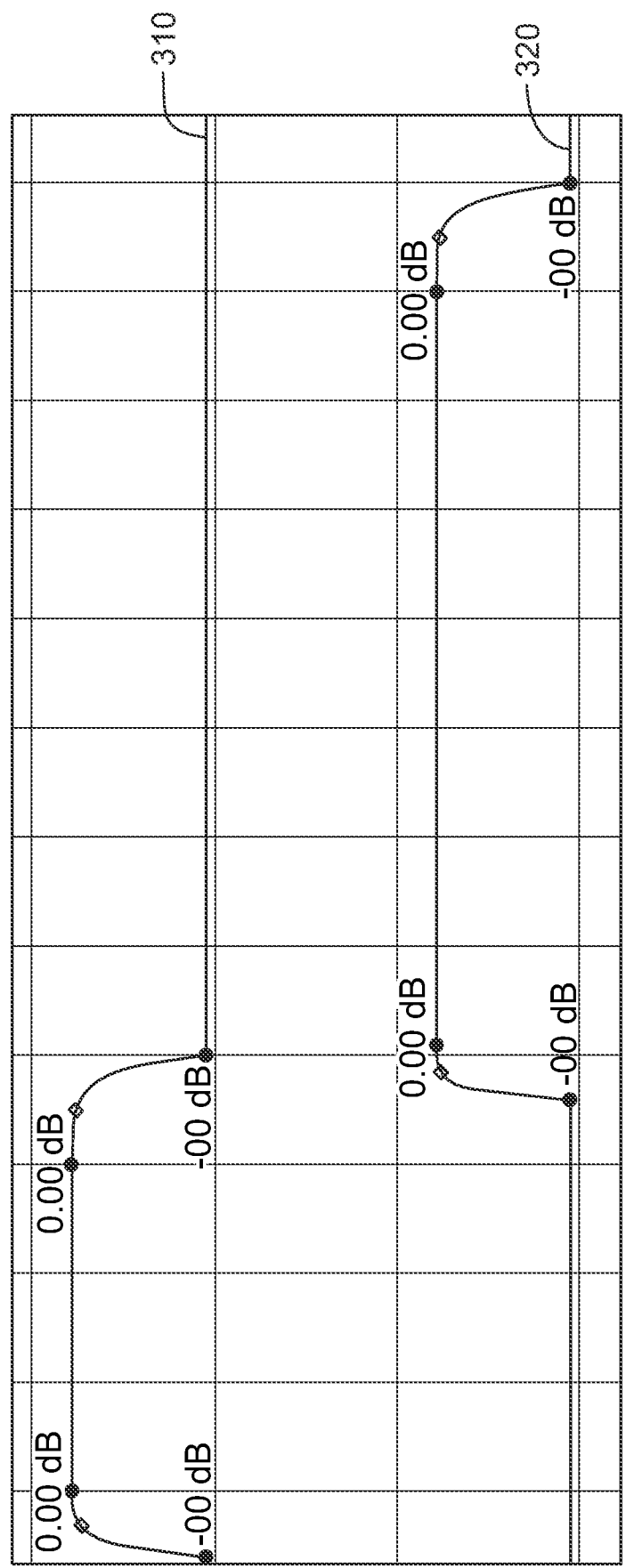
FIG. 3 depicts an illustrative fading of audio tracks during a tier transition in accordance with one or more illustrative aspects discussed herein.

FIG. 3 illustrates an example transition between two tiers of music. The top line of FIG. 3 illustrates a volume of the music corresponding to the current tier of music 310, listed in decibels. The bottom line of FIG. 3 illustrates the volume of the music corresponding to the next tier of music 320. As can be seen in the graph, when the player moves from the current tier to the next tier, the music of the current tier may have its volume lowered while the music of the next tier may increase in volume. The music of the current tier may fade out and the music of the next tier may proceed playing at the full output volume.

The player may move between tiers based on their performance in the game. As the player performs actions in the game, they may increase and/or decrease their tier standing within the game, such as through a score, combo meter, and/or other suitable ways of tracking player performance described herein. Progression through a tier, to the next tier (or back down to the prior tier) may be tracked using a tier meter. Once the user fills the meter (or the meter runs out), the game may advance the user to the next tier (or back down to the prior tier). Typically increasing a tier involves the player performing positive actions within the context of the game, such as Killing enemies
Killing enemies in time with the music
Damaging enemies in time with the music
Using a specialty weapon in time with the music A player tier may decrease based on negative actions taken by the player in the context of the game, such as getting hit by enemies. The game may also penalize players for being passive—the tier meter may be constantly depleting which may require the player to keep performing positive actions to maintain a high tier meter. The rate of depletion may vary based on the current tier, with high level tiers depleting faster than low level tiers. According to some aspects, players might not be directly penalized for failing to perform actions in time with the music, but poorly timed actions may allow the tier meter to keep depleting at its current tier rate.

According to some aspects, each tier may have a multiplier threshold used in accordance with the tier meter to determine when the user has filled the tier meter and thus advanced to the next level. Once the player exceeds the multiplier threshold, the game may advance the player to the next level. As mentioned above, performing positive actions may fill the meter, negative actions may deplete the meter at varying rates.

Figure 4:
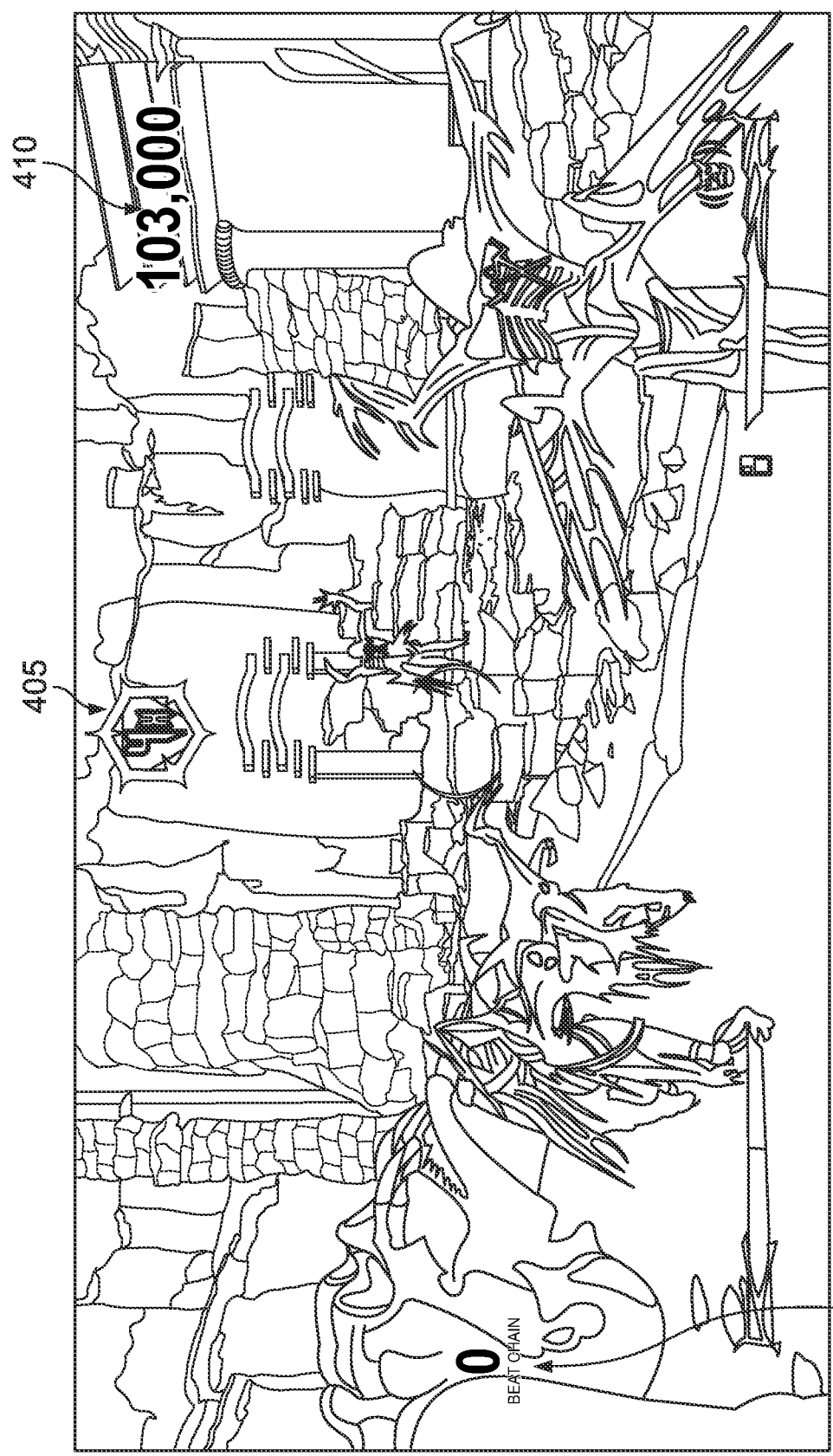
FIG. 4 depicts an illustrative game display in accordance with one or more illustrative aspects discussed herein.

FIG. 4 illustrates an example of the tier meter with multiplier threshold 405, in an illustrative game screen. Also illustrated is a score meter 410 and a combo meter 415.

Figure 5:
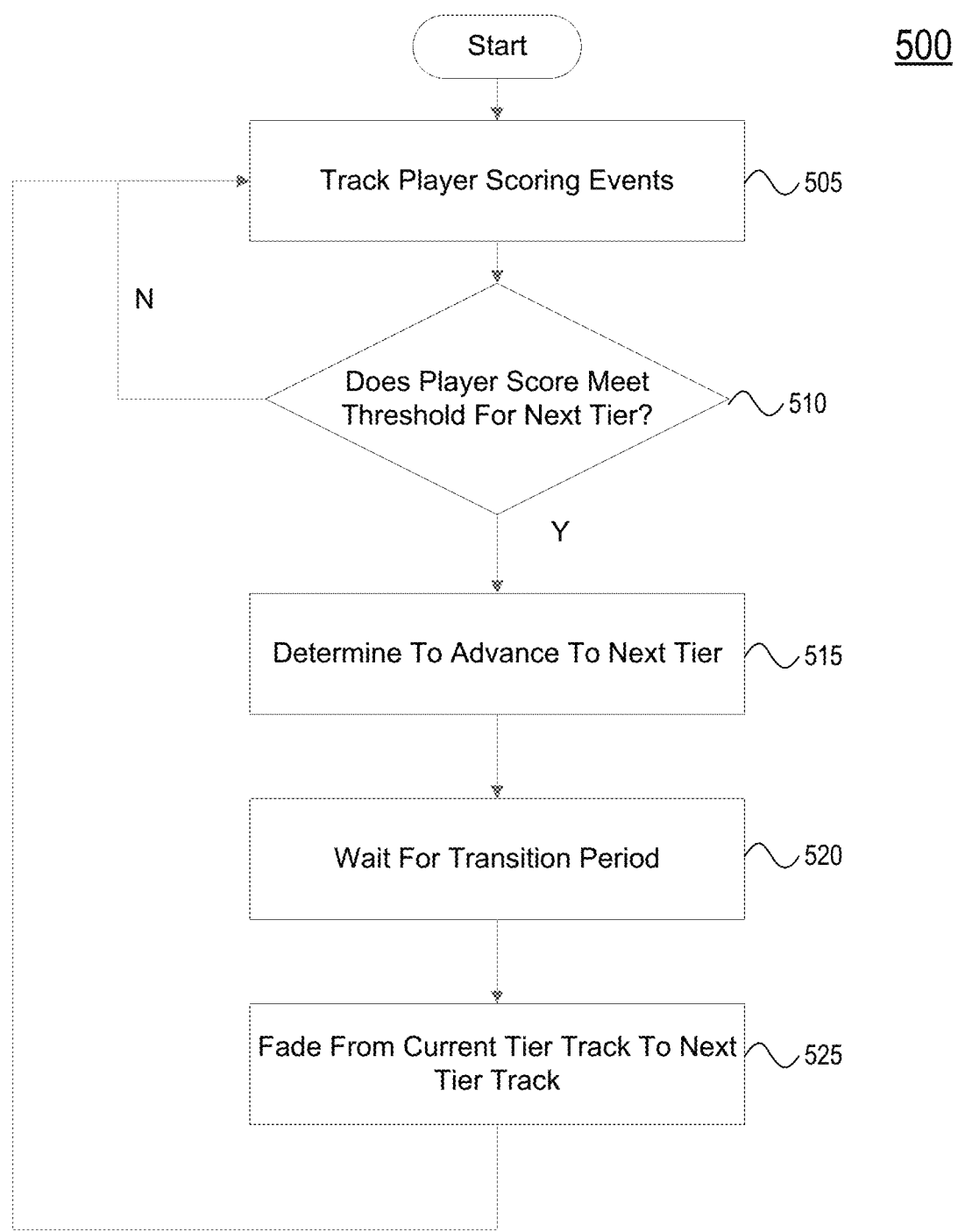
FIG. 5 depicts an example method of transitioning between intensity tiers of audio tracks in accordance with one or more illustrative aspects discussed herein.

The player's tier and/or associated multiplier may be used to determine the amount of score that the player receives from killing enemies (and/or other game actions). For example, using the five tiers example above, a translation table may be:

Tier 1: 1× score
Tier 2: 2× Score
Tier 3: 4× Score
Tier 4: 8× Score
Tier 5: 16× Score FIG. 5 depicts an exemplary method 500 for intensity tier progression, according to aspects described herein. At step 505, the game (e.g., executing on a computing device) may track player scoring events and determine a cumulative score for the play within a current context (e.g., within a portion of the level). At step 510, the game may determine whether the player's score meets a threshold to advance to a next tier. If the score does not meet the requirements for the next tier, the game continues to track player score events, returning to step 505. If the score does meet the requirements for the next tier, the game determines at step 515 to advance to the next tier. At step 520, the game may wait for a transition period. For example, as describer above the game may wait for a random period between 1-3 seconds. At step 525, the game may initiate an audio fade out from the current track corresponding to the current intensity level, and an audio fade in of the next track corresponding to the next intensity level. The method may then return to continue tracking player scoring events at step 505, for example to determine if the player again advances to a further tier of intensity.

Traditional songs have a beginning and end, with segments in between. According to some aspects, songs for a game as described herein may have multiple tracks of varying intensity. But songs for a game as describe herein may also comprise different parts that correspond to gameplay portions or "acts". While tier changes may communicate to the player how well they are doing, act changes may foster the feeling that the music is progressing from start to finish as the player plays through a level. Each act may be a self-contained part of the song and may loop seamlessly from beginning to end of the act. An act may comprise a reasonably long loop of music (for example, 1-2 minutes in duration), which may provide enough variation to hide the fact that the music is looping. One benefit of this act structure is that it may solve the problem of being able to have a song of infinite length, but still have it feel like a real song, since music progression is driven by the player moving forward (within the game) which may take any variable amount of time.

According to some embodiments, a standard act structure may be utilized. These gameplay portions for the songs in the game may be common to each song, such that songs for use in the game are structured to have segments corresponding to each gameplay portion within a game level. For example, each song in the game may follow the same formula with the following acts:

Intro
Act 1
Act 2
Act 3

Although a standard act structure may have benefits described above, the game may apply a flexible act structure to accommodate levels of varying lengths which may comprise additional acts.

In many cases, acts correspond to segments of an overall song, such as an Intro, Verse (Act 1), Chorus (Act 2), and another Verse, Chorus, or some Crescendo (Act 3). However, a more generic structure with the intro and three acts above may allow developers to be flexible for each song and/or level. A goal of the game may be to allow a player to experience a song from beginning to end, with varying intensity depending on how well they play. However, when the player is playing through a level that is not tied to the duration of a song, the game does not know how long it will take for the player to play through a level. Players may enjoy playing at their own pacing, and tying the level length to the duration of the song may force players forward beyond their own pacing. Thus the musical segments of an Act may be relatively long, such as 2 minutes, and may loop if the player is slow and does not progress to the next Act in an expected time.

Figure 6A:
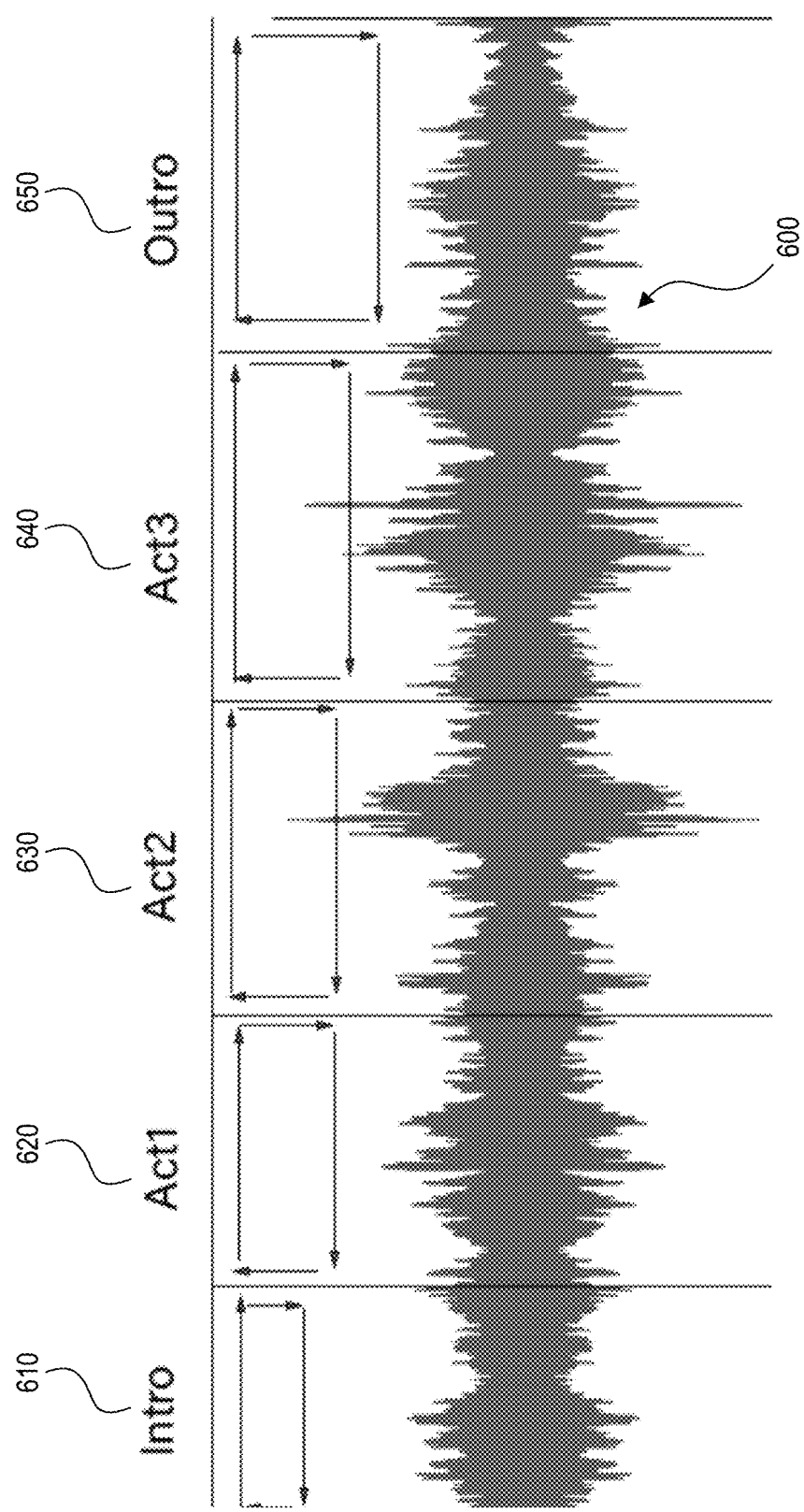
FIG. 6A depicts an illustrative act arrangement for a song/level in accordance with one or more illustrative aspects discussed herein.

Thus, according to aspects described herein, the game may keep playing the same act indefinitely, until the player moves into a separate part of the level. Each song is split into appropriate acts as described above. The transition from one act to another is not driven by time or music, it is triggered by the player (for example, moving from one room to another), according to some aspects. This means that staying in the beginning room of a level will continue to loop the intro (but can still change intensity based on score multiplier), but the song will not progress to the verse until the player moves to the next room. This may result in an infinitely long song, driven by the player, which still follows a musical journey. FIG. 6A illustrates a musical output and looping 600 of acts 610-650.

Progressing through the musical acts, according to aspects described herein, is based on player actions. For example, a trigger to change between acts may be when the player character enters a particular game location (e.g., a defined 3D volume within the level model) or a scripted event (e.g. an in-game cutscene). One problem to solve when moving to a new act is making the transition feel smooth enough for the player. Simply skipping to a particular time signature in the song (e.g., the beginning) when a new act begins may be jarring to the player and may throw the music off beat. A first approach to act transitions may involve transitioning to a new next act on the next beat. This may remove the issue of throwing the music off beat, but may feel unnatural to the player and may seem like someone simply skipping in a song. Another challenge with this first approach is that if the next beat in a 4/4 tempo was, for example, the second beat, a naïve approach would progress into a new act starting at the first beat of a new musical bar when musically we would expect to be on the third beat of the bar.

According to aspects disclosed herein, a second approach to act progression may address these problems. The game may control progression to limit act transition such that it can only happen after the final beat in a musical bar/ measure, such as after the fourth beat in a 4/4 tempo. Act transition points may additionally and/or alternatively be tied to transition markers in the musical tracks for an act, which may be configured by an audio designer at points conducive to musical transitions. Dividing each act into smaller segments, each between a transition marker, may facilitate seamless movement to a new act while not ending up off beat or changing music in the middle of a bar. However, this approach may still be improved further. In this approach, there may still be challenges in transitions between acts. The transitions may occur on beat and happen on a new musical bar, but may nonetheless sometimes feel unnatural. This may be because a new act change could be triggered when the player was not expecting it to be. In a regular musical progression, a musical sequence might have 4 bars of intro, 8 bars of verse, 8 bars of chorus, then return back to verse (for example). But since act changes may happen at any time, the structure of the song could feel a little off to players.

Figure 6B:
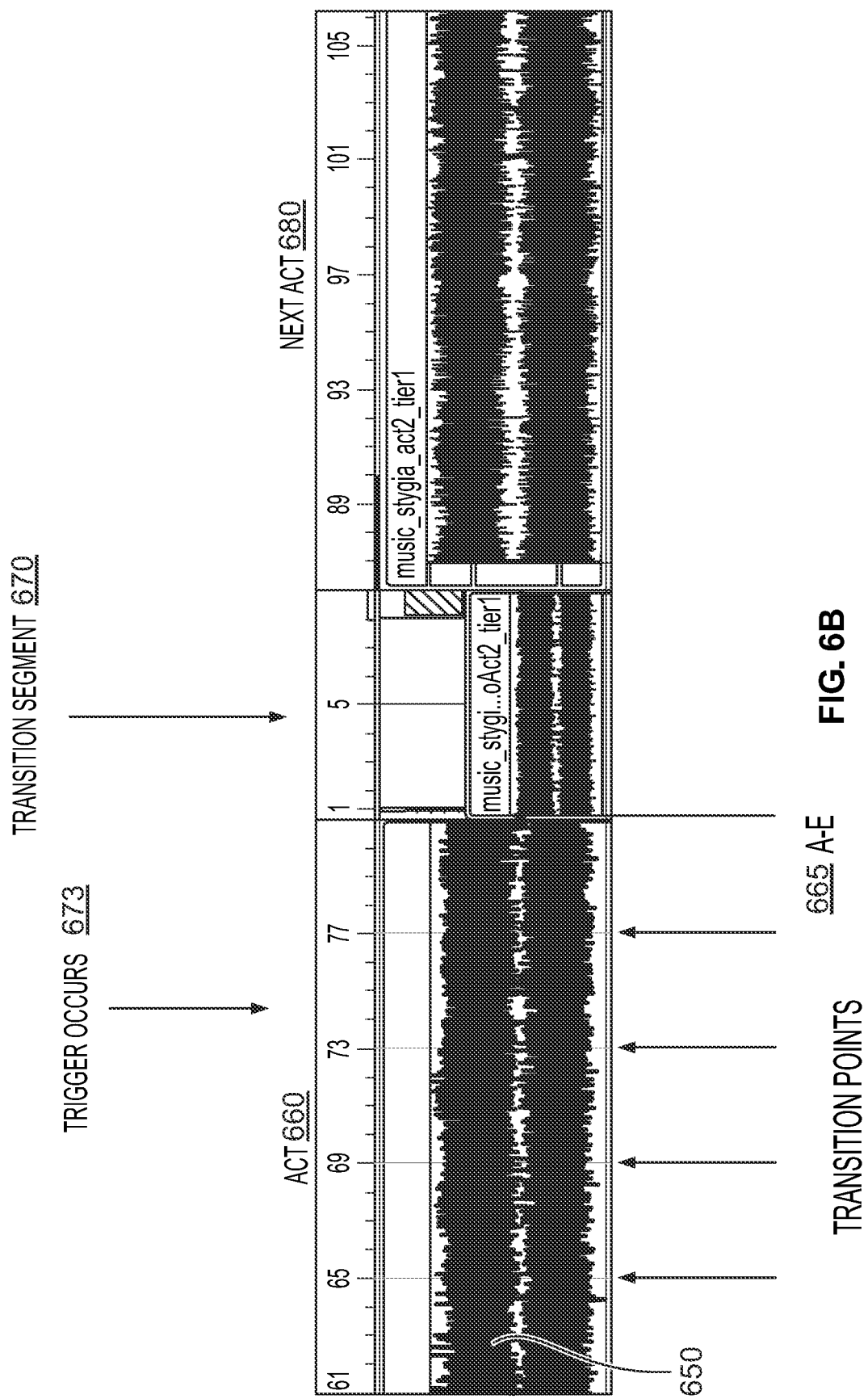
FIG. 6B depicts an example playback diagram when transitioning between acts of a song/level in accordance with one or more illustrative aspects discussed herein.

Thus, a third approach may improve on the second approach by incorporating transition segments. Transition segments may be a small piece of transition music, such as 1-4 musical bars that may indicate something was going to change. For example, a transition segment could comprise a build-up of drums, a small riff change—content serving as a bridge, in musical terms. Structurally, each song may include one or more transition segments between each act which is not part of the defined act loop. When transitioning between acts at a suitable final beat and/or transition marker, the game may playback all or a suitable portion of the transaction segment corresponding to a transition between a current act and the next act. For example, an exemplary embodiment is illustrated in FIG. 6B. Audio playback is illustrated by wave 650. During current act 660, audio playback comprises music corresponding to the current act 660. If a transition to the next act is triggered at time 673 (through suitable gameplay logic, such as determining that the player has progressed through a door to the next act or portion of the level), the music corresponding to the current act will continue playing until a transition point has been reached after the transition is triggered. For example, act 660 may comprise transition points 665A-E regularly (and/or irregularly) spaced in time throughout the track. If the gameplay trigger 673 occurs after transition point 665D, the game will wait until transition point 665E to begin the transition. Once the music reaches transition point 665E (e.g., the next transition point after the trigger occurs), a transition segment 670 (e.g., a musical build up) takes over and starts playing. Once the transition segment is finished, the next act 680 begins and music corresponding to act 680 is played back. As a result, the game may provide the player with a more natural, seamless audio transition between musical acts of the song/level as the player progresses.

Figure 7:
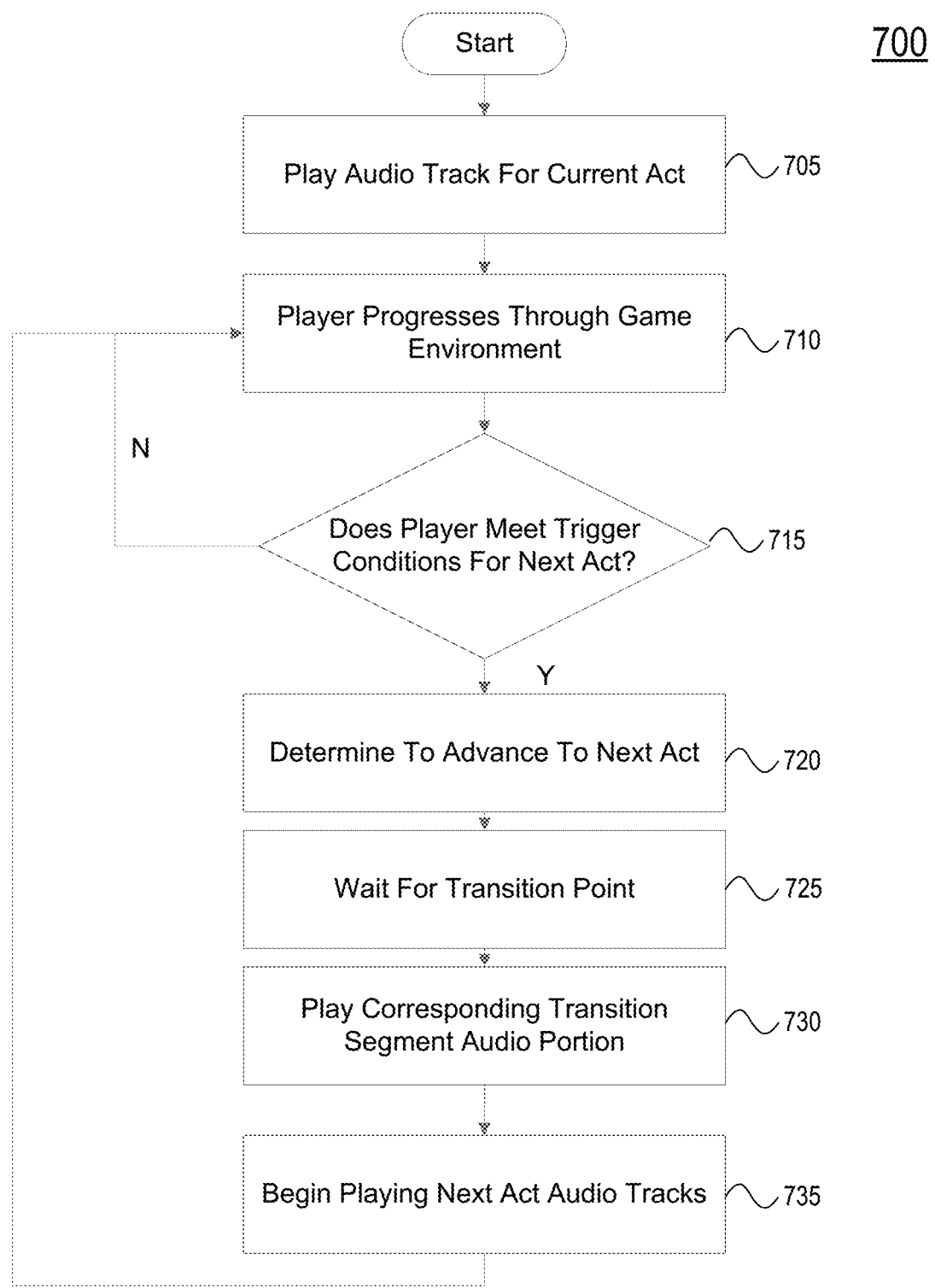
FIG. 7 depicts an example method of transitioning between acts of a song/level in accordance with one or more illustrative aspects discussed herein.

FIG. 7 depicts an illustrative method 700 for act progression in a rhythm-based game. At step 705, the game (e.g., executing on a computing device) may playback audio tracks corresponding to a current act of the level. A particular audio track corresponding to the act but having an intensity level matching the player's current tier of play may be played back, as described above. At step 710, the game may track a player's progress through the game environment, and/or other gameplay conditions. At step 715, the game may determine whether the player meets the trigger conditions for the next act. For example, the game may determine whether the player has entered a defined 3D location within the game environment that is associated with a transition to the next act. As another example, a scripted trigger may occur in the game that triggers the transaction to the next act. If the act change conditions are not met, the game continues to track player progress at step 710. If the player does meet the trigger conditions for the next act, the game may determine to advance to the next act at step 720. At step 725, the game may wait for a transition point within the tracks for the current act. At step 730, the game may play a transition segment audio track corresponding to a transition between the current act and the next act. Once the transition segment is complete, at step 735 the game may play the audio tracks corresponding to the next act. For example, the audio track corresponding to the next act at the player's current intensity tier may be selected and played back. The game may return to tracking the player's progress through the level and track transition to a further act.

Beat Matching and Audio/Visual Feedback

Games implementing one or more aspects described herein may perform beat matching techniques to determine how well-timed player inputs are in time with the music, and utilize audio and visual feedback to assist the player in improved timing.

Beat matching, as tracked by the game, is the act of clicking a button (for example, gamepad or mouse or preferred input) at the same time as the beat (or tick) in music occurs. In some implementations, a bear may occur every 4/4 per measure as in standard music theory. In such implementations, a measure of music would always have 4 beats and the player would have 4 opportunities per measure to press a button on beat successfully.

The game may keep track of the amount of samples that have been played from the audio system—known as DSP time. For each frame (e.g., units of gameplay updates), the game may check:

Where in the song are we?
Are we on a beat (see below calculation)?
Has the player pressed the correct input close to when a beat occurs?

Because songs for the game, according to some aspects, are commonly authored according to the game mechanics described above, the game can pre-determine the tempo of each song and hence calculate the tempo and when each beat occurs during gameplay. Audio analysis is not necessary to calculate the in-game beat timing. For example, if a song has 130 beats per minute (bpm), the time between beats can be calculated by (60 seconds/130)=0.46153 seconds.

However, audio feedback can be an important aspect of successful rhythm gameplay to players. The user needs to know that they have performed an action correctly. According to some aspects, the game may provide feedback in output audio elements to assist the player in determining how well-timed their actions were. For example, an embodiment may provide a core success feedback mechanism through a kick drum that plays in beat with the rest of the music, essentially reinforcing the beat. The game may play the sound the player expects to hear when they do something correctly. But if the player fails to hit on beat, the sound is cut off. This feedback may assist the player in providing successful on beat input.

The audio feedback may be implemented using a new track, different from the music corresponding to the tiers, playing at the same time as the level song. The track may contain the audio feedback, such as the kick drum playing on beat throughout the song. This audio feedback thus indicates the beat to the player. In some implementations, some audio feedback may be tied to whether the user is equipped with a special weapon or other gameplay criteria. For example, certain weapons or gameplay approaches may have the weapon (or other aspect) itself trigger a sound, and the objective may be for the player to use (e.g., shake) the weapon in time with the music. However, even players with musical skill may have a challenge with keeping perfect timing between the weapon inputs and the game music. This may result in an audio experience that feels off beat. Similarly, even with timely inputs, latency in input lag, video latency, and/or audio latency may create a scenario where a perfectly on beat input occurs too late to feasibly play a sound in response while sounding on beat to the player.

Thus, according to some aspects the volume of the on beat track (e.g., the kick drum track) may be raised assuming the player is going to hit the beat. Rather than play a sound when the user provides input, the game may instead render a separate track with the audio feedback playing on each beat and control the volume of this track based on player inputs. When the game gets a beat, the game expects user input. If the successful, on beat user input is not received by the time the game leaves the beat (e.g., advances to the next beat), then the player has failed to hit the beat. If the player misses the beat, the game can immediately cut off the volume of the on beat track. The volume of the on beat track may remain muted until the user successfully hits a beat, at which point the on beat track may be raised back up in volume. In this way, a player may receive audio feedback for on beat hits that encourages further on beat hits. By raising the volume instead of queuing up a piece of audio to play, the kick sound may be perfectly on beat and to the player it makes no difference, they still perceive it as them hitting perfectly on beat.

Since the on beat track is always in perfect sync with the beat, hitting the beat, even if the player is off or early by a few milliseconds, the on beat track will still play and the player will feel like they are always hitting perfectly on beat. This may help account for inherent delays in receiving player input, as well as the player's brain receiving the audio feedback output by the game. Raising or lowering the volume of the feedback track need only be done when the player's timely input state changes. That is, when the player goes from failing to be on beat to hitting on beat, the volume may be raised. Similarly, when a player starts to fail to hit on beat input, the volume may be lowered. If the player maintains consecutive on beat inputs, no change is needed and the game keeps playing the feedback track at the current volume.

Accordingly, when the game receives player attack input, the game may determine if the input is within a beat threshold (e.g., whether the input in on beat or close). If the prior input was on beat, then no change is needed. If the prior input was off beat, then the game can raise the volume of the feedback track. If the player's current input is not on beat, then the game can lower the volume of the feedback track if not already at a low or muted volume.

The audio feedback techniques described above may introduce two artifacts. First, when the on beat track is playing and the user misses a beat, cutting of the sound can sometimes be audible. However, this artifact can be solved using game audio effects. To eliminate audio popping, according to some aspects, instead of transitioning instantly between—infinity and 0 DB, the game may perform a very fast linear fade in and out. Around 8-10 milliseconds may be enough to remove potential pops.

Similarly, when the user has missed a beat and manages to get on beat the next beat, the game raises the on beat volume. Since this can happen slightly after a beat, the first kick drum (or other audio feedback) may be slightly cut off. Beginning playing a sound on player input, even when that input is perfectly on beat, may be already too late in view of latency. The same applies to a fade. The game may need to know ahead of time if the player is going to hit on beat or not in order to play a perfect first kick (feedback) when the state changes. This challenge may be mostly mitigated as, once a beat occurs and the player presses a button, the worst case is that the volume is raised as the kick sample "punch" has already played, missing out on the beginning of the sample. The effect may be subtle, and most players would not notice. But to mask it further, the game may play another sound on top as this is happening. For example, a lower frequency rumble or hiss may suffice, though may be an imperfect cover in case of the sound in question containing a tight kick. This can also be addressed using audio effects such as delay and reverb.

In an ideal scenario, the approach may aim to begin raising the volume right at the beginning of the kick. However, the game may not know until the sample has played for a few milliseconds that the player has pressed a button successfully "on beat". The volume may be raised to maximum at this point, where the sample looks different. At this point, the audio playback may have essentially "missed" the punchy part of the kick drum, resulting in a completely different sound. This may be for the most part unavoidable, but by layering another sound effect at this time, the game may mask this artifact to a degree. On balance, it may be an acceptable trade-off for perfectly in sync player feedback and may only be noticeable on the first beat when transitioning from success to failure and vice versa.

Figure 8:
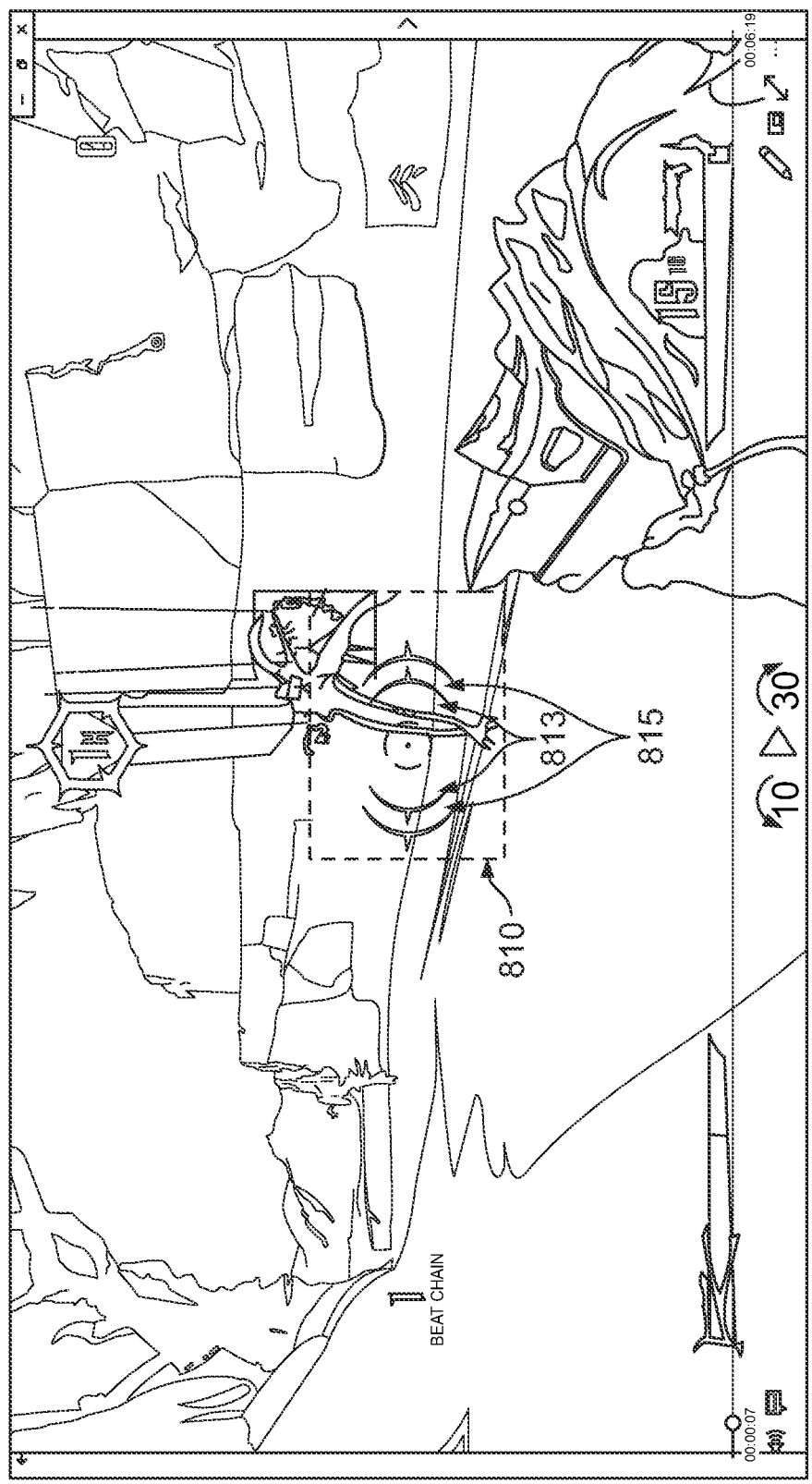
FIG. 8 depicts an illustrative game display in accordance with one or more illustrative aspects discussed herein.

Visual feedback may be also be provided to assist the user in timely providing on beat inputs. As illustrated in FIG. 8, and according to some aspects, a game user interface may provide feedback on when a new beat is about to occur through the in-game reticule 810 at the center of the screen. The reticule may indicate on the user interface where the player character, in a first-person view or other view, is looking and/or aiming. In some implementations, the reticule may comprise two fixed arcs 813 on each side of the reticule. These fixed arcs are static on the screen. An additional two arcs 815 may move from outside of the reticule inwards, towards the two fixed arcs in time with the beat.

When the yellow arcs are in the same position (e.g., overlapping) as the corresponding fixed arcs, this indicates that we are on a beat in the music. The yellow additional arcs may continuously move towards and away from the fixed arcs for every beat that occurs in the music. The additional arcs may move from outside the fixed arcs, to a point overlapping the fixed arcs on the beat, then past the fixed arcs into the center of the screen as the beat ends. This may provide the player a visual representation of rhythm, available at all times, clearly visible in the center of the screen.

The time that the yellow additional arcs take to travel from their starting position to the middle of the screen, may be set to be the time it takes for one beat to finish, e.g. 60 seconds/130 bpm=0.46153 seconds of travel.

Weapons and Enemies—on Beat Game Mechanics

Weapons in the game may each have an on-beat and an off-beat effect. On-beat kills (meaning that the player fires the weapon in time with the music) may give the player more score and opens up enemies for melee attacks or "overkills".

When a player action kills an enemy on beat, the game may use more intense/exciting/over the top visual effects. This may reinforce a feeling of success for well-timed inputs. Enemies may be killed by actions off beat, but without some of the rewards for on beat action. For example, an off beat action such as a weapon swing may do the same damage as an on beat weapon swing, but the points awards for a kill may be greater for an on beat action than for an off beat action. Achieving a high score may be the goal of the game for players, so on beat actions are rewarded.

Different weapons in the game may have alternative fire actions/attacks, or an "ultimate" attack. Ultimate attacks may only be enabled when a weapon-specific ultimate meter has been filed. The ultimate meter for a weapon may fill up when killing enemies on beat. In some implementations, killing enemies off bear will not contribute to filling the ultimate meter. Ultimate attacks may be more powerful and may provide players with a significant advantage in certain in-game situations.

Players may receive various gameplay bonuses for on-beat actions. For example, on-beat actions may provide damage bonuses, with on beat actions doing more damage than off beat attacks. Or, as described above, an on beat kill action may provide more score points than an off beat action. Other gameplay items may determine score, such as whether the action represented a "headshot." In some implementations, the highest score may be achieved by performing a combination of on beat and skillful actions, such as an on beat headshot.

Enemy characters may perform actions in time with the music. For example, Marionette enemies may move in beat with the music, gliding from one position to the next, every other beat. Instead of moving the enemy continuously, this may be implemented by determining the amount of time it takes for a number (e.g., 2) of beats to occur, determining a destination position based on a speed attribute of the enemy, and start moving the enemy on a beat while ending the animation after the number of beats (e.g. 2).

Bpm-Independent Gameplay Synchronization

Beyond synching up audio with the beat, attacks and animations of both players and enemies may be synched up to the beat as well. This may emphasize musicality in gameplay. This may present several challenges, particularly for animations that have an enemy reaction component. Within the game, the player can be in any 3D position within the game world (within the rules of the game). An enemy may be in any 3D position, facing any direction, and/or performing any action. The player and enemy animations may need to be synchronized, for example to depict the enemy reacting to a player attack. And the animations may need to be synchronized with the music. For example, the animations in the game may be controlled to start on a beat, rather than in-between beats and may scale in speed, depending on the speed of the music.

Attack animations (e.g., special attacks) may thus define a sync point for the player and enemy. A sync point may be where the players and enemies need to interpolate their respective positions to arrive during the animation. This point may be the starting point for both characters when playing the animation. Both the player and enemy animation may be uniform length, according to some aspects, since the speed of the animation may be dictated by the speed of the music. And the animation may define how many beats it lasts for.

Figure 9:
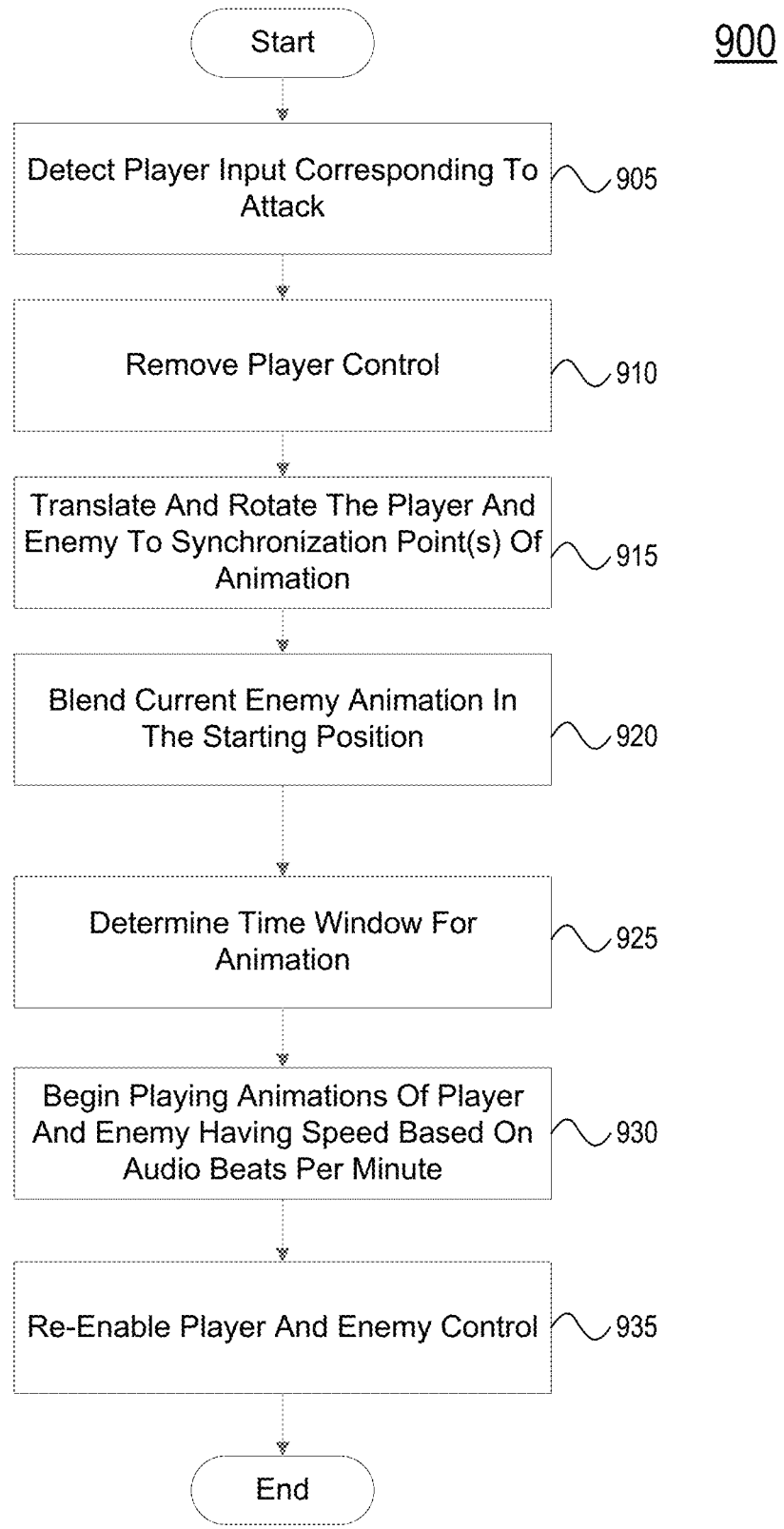
FIG. 9 depicts an example method of controlling animation timing in accordance with one or more illustrative aspects discussed herein.

FIG. 9 illustrates an example method 900 of synchronizing gameplay and animations. Method 900 may begin at step 905 when the game detects player input corresponding to an attack, such as a special attack. At step 910, the game may remove control from the player and begin the attack animation processing. At step 915, the game may translate and rotate the player character and the enemy character to synchronization point(s) defined by the animation. The synchronization points may define respective starting points for the player and enemy characters, in some implementations. In some implementations, the synchronization point may define a center or reference point of the animation, and the player character and enemy character may be located relative to the reference point. At step 920 the game may blend a current enemy character animation based on a starting position for the enemy character. At step 925, the game may determine a time window for the animation. For example, the game may determine a time window corresponding to the remaining time between the current beat and a next beat of the music. Depending on the animation length, the distance between the player and the enemy, and/or the distance between the player/enemy and synchronization point(s), the game may determine to extend the animation time window to encompass an additional beat. At step 930, the game may begin playing the animations to depict the player character as performing the special attack and to depict the enemy character as responding to the attack (e.g., being hit by the attack). The animation playback speed may be determined based on the beats per minute of the audio track currently playing, which may be used to determine the time window in step 925. On completion of the animations, the game may re-enable control for the player at step 935. The game may re-enable a controlling logic/artificial intelligence for the enemy character if the special attack did not result in killing the enemy.

Latency and Calibration

Different forms of latency may cause the game output and the player's actual receipt of that output to be out of sync. Latency may take the form of visual latency, audio latency, and/or input latency. But even if not technical latency, games may be designed to facilitate "user latency" or error associated with player's imperfect ability to hit all input precisely on time. Aspects described herein may help alleviate the impact of latency on the user's experience, and may adjust the game's processing of input to account for the impact of latency on the player's inputs and be more forgiving of human error.

Audio latency may correspond to the time it takes for the software to tell some hardware to play some kind of sound plus the time it takes for that sound to reach the player's speakers/headphones and the player's brain to perceive it as a sound.

Visual latency may correspond to a delay to render a scene by the software plus a small delay to get the display output to a monitor/television to your monitor. Particularly on televisions, visual latency can be significant. Rendering things on the screen always comes at some cost, and that cost may be reflected in display latency.

Input latency may correspond to the time it takes for the player to press a button/key and for this to register in the game.

Even with perfect settings in the above categories, there is still a human aspect to take into account. Any change in audio/visual latency may throw a player off—but there is also the simple fact that many people are not musical, or not able to coordinate complex gameplay with beat matching. This can be an important factor in providing the player with a fun experience.

According to some aspects, the game may provide basic calibration options to the player, such as moving a slider until an audio beep is audible at the same time as a dot appears in the UI. But this type of calibration only solves part of the problem. To account for reasonable human error and provide the player with a reasonably forgiving experience, the game may adapt to the player during a prolonged length of time by checking the input of the player trying to hit a beat vs how far off the player is to actually performing something on beat (given any of the 4 above latency types, likely in combination). Based on this net "latency" delay, the game may adjust the window for beat matching.

Figure 10:
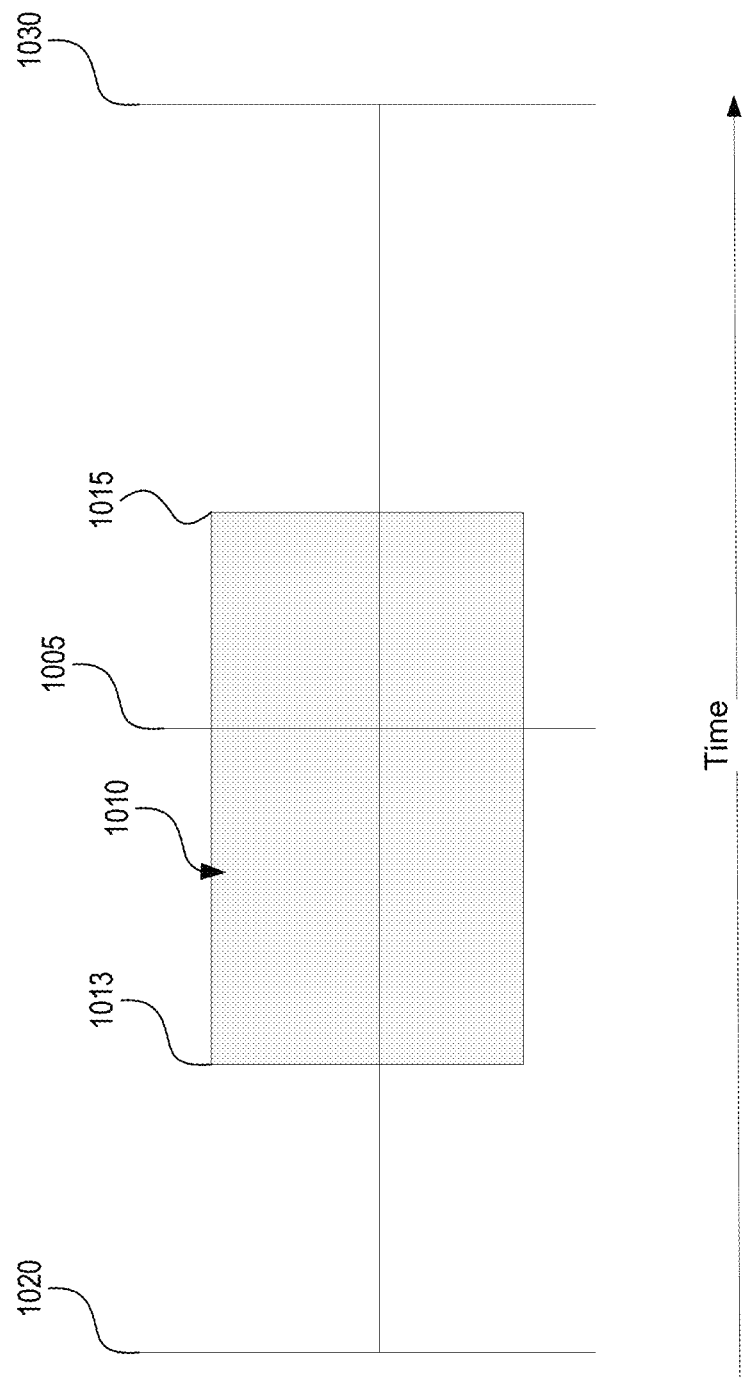
FIG. 10 depicts an illustrative input window in accordance with one or more illustrative aspects discussed herein.

Hitting something on-beat in a game, according to aspects described herein, means hitting a desired button exactly at the time a beat occurs or within a window that is just before the beat or just after the beat. FIG. 10 illustrates such a timing window 1010. Time 1005 may represent input that is perfectly on beat, with times 1020 and 1030 representing a prior and next beat, respectively. Thresholds 1013 and 1015 may represent an acceptable window of time in which input may still be considered on beat for beat 1005. The size of this window may be set according to the game difficulty, where a small window requires a great deal of accuracy (a hard difficulty) and a large window is very lenient with awarding the player with on-beat effects (an easier difficulty).

In the visualization of FIG. 10, any input that would occur within the window, either early, late or substantially/exactly when the beat occurs will be considered a successful on-beat input. The game may account for reasonable human error and the size of the window may be based on providing the user with a (reasonably) forgiving window, such as a window of 0.3 seconds during which input may still be considered on beat. In the example of a 0.3 second window, a user can hit 0.15 seconds early or late and still be considered on beat. The size of the window may be adjusted based on a game difficulty, for example a 0.4 s window for easy, 0.3 s for medium, and 0.2 s for easy. The time window may be adjusted forwards or backwards, rather than just in length, to account for latency based on latency settings for the user.

By leveraging various aspects of these techniques and/or other features described in further detail herein, a game may provide a player with an enhanced, fun experience in a musical rhythm-based game.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   determining a plurality of musical acts corresponding to a level of a rhythm-based game, wherein each musical act corresponds to a respective song portion and comprises a plurality of different audio tracks each comprising versions of the respective song portion, and wherein each audio track of the plurality of audio tracks for a given musical act corresponds to a respective tier of a set of player performance tiers;
   beginning the level of the rhythm-based game, wherein a beginning of the level corresponds to a first musical act and a first player performance tier;
   playing back audio of a first audio track, of the plurality of different audio tracks corresponding to the first musical act, that corresponds to the first player performance tier;
   tracking a plurality of player actions using a tier meter, wherein player actions performed on beat with the audio of a current audio track cause the tier meter to increase;
   determining, based on the tier meter, that the player has advanced to a second player performance tier of the set of player performance tiers but remains within the first musical act;
   in response to determining that the player has advanced to the second player performance tier, playing back audio of a second audio track, of the plurality of different audio tracks corresponding to the first musical act, that corresponds to the second player performance tier;
   determining, based on the tracked player actions, that the player meets a trigger criteria to transition to a second musical act; and
   in response to determining that the player has advanced to the second musical act, playing back audio of a third audio track, or the plurality of different audio tracks corresponding to the second musical act, that corresponds to the second player performance tier.

2. The method of claim 1, wherein playing back the audio of the second audio track comprises transitioning from the first audio track to the second audio track by continuously lowering a volume of the first audio track while increasing a volume of the second audio track.

3. The method of claim 1, wherein playing back the audio of the second audio track comprises transitioning from the first audio track to the second audio track after waiting for a predefined transition period.

4. The method of claim 1, wherein playing back the audio of the third audio track, for the second musical act, comprises transitioning from the second audio track to the third audio track by playing a transition segment audio track before playing the audio of the third audio track.

5. The method of claim 1, wherein the trigger criteria corresponds to the player entering a defined region of a game world associated with the game.

6. The method of claim 1, wherein the trigger criteria corresponds to a scripted event.

7. The method of claim 1, further comprising:
determining, based on the tier meter, that the player has regressed to the first player performance tier of the set of player performance tiers but remains within the first musical act; and
in response to determining that the player has regressed to the second player performance tier, playing back audio of the first audio track, of the plurality of different audio tracks corresponding to the first musical act, that corresponds to the first player performance tier.

8. The method of claim 1, further comprising:
determining, based on the tier meter, that the player has advanced to a third player performance tier of the set of player performance tiers after the player has advanced to the second musical act; and
in response to determining that the player has advanced to the third player performance tier, playing back audio of a fourth audio track, of the plurality of different audio tracks corresponding to the second musical act, that corresponds to the third player performance tier.

9. The method of claim 1, wherein a player action is considered performed on beat based on player input being received within a defined window of time surrounding the beat of the current audio track.

10. The method of claim 1, wherein tracking the plurality of player actions using a tier meter comprises tracking a player score corresponding to in-game events.

11. The method of claim 1, wherein the plurality of different audio tracks for a given musical act each represent separately mastered versions of the same song portion.

12. The method of claim 1, wherein the plurality of different audio tracks for a given musical act each add an additional musical element beyond the audio track for a prior player performance tier.

13. The method of claim 1, wherein the audio tracks for a given musical act loop until the player advances to a next musical act.

14. A computing device comprising:
one or more processors; and
memory storing instructions that, when executed by the one or more processors, cause the computing device to:
determine a plurality of musical acts corresponding to a level of a rhythm-based game, wherein each musical act corresponds to a respective song portion and comprises a plurality of different audio tracks each comprising versions of the respective song portion, and wherein each audio track of the plurality of audio tracks for a given musical act corresponds to a respective tier of a set of player performance tiers and comprises a separately mastered version of the song portion corresponding to the given musical act;
begin the level of the rhythm-based game, wherein a beginning of the level corresponds to a first musical act and a first player performance tier;
play back audio of a first audio track, of the plurality of different audio tracks corresponding to the first musical act, that corresponds to the first player performance tier;
track a plurality of player actions using a tier meter, wherein player actions performed on beat with the audio of a current audio track cause the tier meter to increase;
determine, based on the tier meter, that the player has advanced to a second player performance tier of the set of player performance tiers but remains within the first musical act;
in response to determining that the player has advanced to the second player performance tier, play back audio of a second audio track, of the plurality of different audio tracks corresponding to the first musical act, that corresponds to the second player performance tier;
determine, based on the tracked player actions, that the player meets a trigger criteria to transition to a second musical act; and
in response to determining that the player has advanced to the second musical act, play back audio of a third audio track, or the plurality of different audio tracks corresponding to the second musical act, that corresponds to the second player performance tier.

15. The computing device of claim 14, wherein the instructions cause the computing device to play back the audio of the second audio track by causing the computing device to:
transition from the first audio track to the second audio track by continuously lowering a volume of the first audio track while increasing a volume of the second audio track.

16. The computing device of claim 14, wherein the instructions cause the computing device to play back the audio of the third audio track by causing the computing device to:
transition from the second audio track to the third audio track by playing a transition segment audio track before playing the audio of the third audio track.

17. The computing device of claim 14, wherein the trigger criteria corresponds to the player entering a defined region of a game world associated with the game or a scripted event.

18. The computing device of claim 14, wherein the instructions further cause the computing device to:
determine, based on the tier meter, that the player has regressed to the first player performance tier of the set of player performance tiers but remains within the first musical act; and
in response to determining that the player has regressed to the second player performance tier, play back audio of the first audio track, of the plurality of different audio tracks corresponding to the first musical act, that corresponds to the first player performance tier.

19. The computing device of claim 14, wherein the instructions further cause the computing device to:
determine, based on the tier meter, that the player has advanced to a third player performance tier of the set of player performance tiers after the player has advanced to the second musical act; and
in response to determining that the player has advanced to the third player performance tier, play back audio of a fourth audio track, of the plurality of different audio tracks corresponding to the second musical act, that corresponds to the third player performance tier.

20. A method comprising:
determining a plurality of musical acts corresponding to a level of a rhythm-based game, wherein each musical act corresponds to a respective song portion and comprises a plurality of different audio tracks each comprising versions of the respective song portion, and wherein each audio track of the plurality of audio tracks for a given musical act corresponds to a respective tier of a set of player performance tiers and comprises a separately mastered version of the song portion corresponding to the given musical act;

beginning the level of the rhythm-based game, wherein a beginning of the level corresponds to a first musical act and a first player performance tier;

playing back audio of a first audio track, of the plurality of different audio tracks corresponding to the first musical act, that corresponds to the first player performance tier;

tracking a plurality of player actions using a tier meter, wherein player actions performed on beat with the audio of a current audio track cause the tier meter to increase;

determining, based on the tier meter, that the player has advanced to a second player performance tier of the set of player performance tiers but remains within the first musical act; and in response to determining that the player has advanced to the second player performance tier, playing back audio of a second audio track, of the plurality of different audio tracks corresponding to the first musical act, that corresponds to the second player performance tier.

* * * * *